United States Patent Office 3,810,886
Patented May 14, 1974

3,810,886
DERIVATIVES OF DIGITOXIGENIN
Herman Rutner, Hackensack, N.J., and Raul Rapun, Suffern, and Nathan Lewin, New York, N.Y., assignors to Becton, Dickinson and Company, East Rutherford, N.J.
No Drawing. Filed May 24, 1971, Ser. No. 146,542
Int. Cl. C07c 173/02
U.S. Cl. 260—239.57
29 Claims

ABSTRACT OF THE DISCLOSURE

Derivatives of digitoxigenin having the following structural formula:

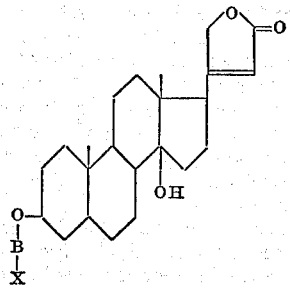

wherein B is succinyl, maleyl, o-phthaloyl or fumaryl and X is an unlabeled or radioiodinated amino acid radical.

A preferred compound is radioiodinated 3-succinyl digitoxigenin-L-tyrosine and the compounds, which are water soluble, are useful for the radioimmunological assay of digitoxin.

FIELD OF THE INVENTION

This invention relates to new cardenolides, and more particularly, to new derivatives of digitoxigenin. Still further, this invention relates to radiolabeled derivatives of digitoxigenin for use in the radioimmunological assay of digitoxin.

BACKGROUND OF THE INVENTION

Oliver et al. in the J. Clin. Investig., vol. 47, 1035–1042 (1968) have disclosed the use of radioiodinated succinyl digitoxigenin tyrosine methyl ester for the radioimmunological assay of digitoxin. The use and preparation of this compound, however, requires a burdensome procedure as the result of the water insolubility of succinyl digitoxigenin tyrosine methyl ester.

SUMMARY OF THE INVENTION

Accordingly, an object of this invention is to provide new cardenolide derivatives.

A further object of this invention is to provide new derivatives of the digitoxigenin which are useful as or in the preparation of compounds for the radioimmunological assay of digitoxin.

These and other objects of the invention should be more readily apparent from reading the following detailed description thereof.

In brief the objects of this invention are accomplished by providing cardenolides represented by the following structural formula:

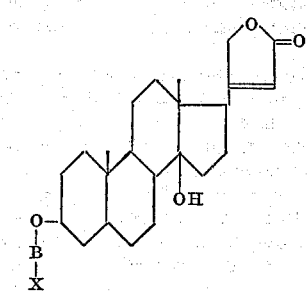

wherein B is either succinyl, maleyl, fumaryl or o-phthaloyl, preferably succinyl; and
X is one of the following amino acid radicals:

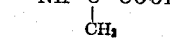

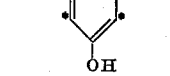

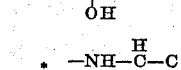

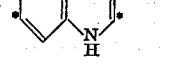

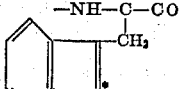

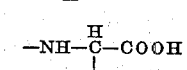

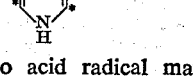

wherein the amino acid radical may be unlabeled or radiolabeled, preferably radioiodinated with one or two radioiodine atoms, with the probable positions thereof being indicated by an asterisk. The radio-active iodine is generally $^{125}I$, but other iodine isotopes, such as $^{134}I$, may also be employed.

These compounds are prepared either from 3-succinyl digitoxigenin by direct reaction with an amino acid or by the hydrolyses of the amino acid ester conjugates produced by Oliver et al. The compounds of the present invention are water soluble, and as a result, may be facilely used for the radioimmunological assay of digitoxin.

DETAILED DESCRIPTION OF THE INVENTION

The compounds of the present invention are prepared from digitoxigenin by reaction thereof with succinic anhydride to produce digitoxigenin-3-hemisuccinate, as disclosed in the aforementioned article of Oliver et al. Alternatively, maleic anhydride or o-phthalic anhydride may be used instead of succinic anhydride to produce the corresponding maleyl and o-phthaloyl derivatives, respectively.

The digitoxigenin-3-hemisuccinate is then coupled to the desired amino acid using either isobutyl chloroformate, ethyl chloroformate or pivaloyl chloride for mixed anhydride formation. The mixed anhydride can be generated under anhydrous conditions in an inert solvent such as dichloromethane, chloroform, ethyl acetate, dioxane, tetrahydrofurane, monoglyme, diglyme, etc. at a temperature ranging from $-10°$ to $25°$ C., preferably at $-5°$ to $10°$ C., in the presence of one equivalent of an organic base; e.g., triethylamine, tri-n-butylamine, tri-n-octylamine, N-methylmorpholine, etc. An amino acid, such as L-tyrosine in a solvent in which the amino acid is at least partially soluble (generally a solubility of at least 5%) is coupled to the mixed anhydride at the aforesaid temperatures in the presence of an additional equivalent of base to produce 3-succinyl digitoxigenin-L-tyrosine. The solvent may be a dipolar aprotic solvent, such as dimethyl formamide, dimethyl sulfoxide, etc. or a solvent such as pyridine, quinoline, etc.

Isolation of the desired coupling product involves removal of basic impurities and ureacted starting material by contacting the solution of the reaction mixture with an immiscible solvent, such as ethyl acetate, with dilute aqueous mineral acid. The product may be purified by preparative thin layer chromatography and/or gel fitration.

It is to be understood that this method is also applicable to digitoxigenin-3-hemimaleate and digitoxigen-3-hemiphthalate and to the other amino acids; i.e., histidine, 4-hydroxyphenylglycine, tryptophan and 5-hydroxytryptophan.

Alternatively, the digitoxigenin-3-hemisuccinate amino acid methyl ester is prepared from 3-succinyl digitoxigenin and a methyl ester of the amino acid by the method disclosed by Oliver et al. It is to be understood that the method disclosed by Oliver et al. is equally applicable to digitoxigenin - 3 - hemimaleate and digitoxigenin - 3- hemiphthalate as the digitoxigenin derivative and to the methyl esters of the following amino acids: histidine, 4-hydroxyphenylglycine, tryptophan, and 5-hydroxytryptophan.

It is also to be understood that a lower alkyl ester (up to 6 carbon atoms) may be used instead of the methyl esters.

The succinyl digitoxigenin amino acid lower alkyl ester is then hydrolyzed to succinyl digitoxigenin amino acid by contact with an excess of base ranging from about 5 to about 50 equivalents, preferably from about 10 to about 20 equivalents, in the presence of water and/or an inert solvent. The bases which may be employed in this step are exemplified by: triethylamine, sodium carbonate, potassium carbonate, sodium hydrogen carbonate, potassium hydrogen carbonate, ammonia or the like. Expecially preferred are alkali metal carbonate, alkali metal hydrogen carbonate and ammonia. A preferred inert solvent of this step is a water-miscible solvent; for instance alcohols such as methanol, ethanol, propanol, sec-butanol, tert-butanol, amyl alcohol, etc., ketones such as acetone, methyl ethyl ketone, etc., ethers such as diethyl ether, dioxan or tetrahydrofuran and the other solvents such as dimethyl formamide, dimethylsulfoxide and the like. They may be mixed with each other so as to dissolve the reagent or the starting material. Hydrolysis of this step usually requires water, but in some cases the reaction may proceed via hydrolysis or exchange reaction of carbonate residue and hydrogen atom of the solvent or reagent. The hydrolysis is effected at a temperature from about $5°$ C. to about $50°$ C., preferably from about $20°$ C. to about $25°$ C. for a period of five to twenty days for alkali metal bicarbonates or for three to forty-eight hours for alkali carbonates and bases of comparable basicity.

The hydrolysis product is recovered by a sequence of steps comprising neutralization, removal of neutral impurities, precipitation by acidification, preparative thin layer chromatography and/or gel filtration.

The radioiodinated derivatives may be prepared by one of the following methods:

(1) Chloramine T Method of Hunter-Greenwood, W. M. Hunter, R. C. Greenwood, Nature 194, 495 (1962);

(2) Iodine Monochloride Method, M. Ceska, F. Grossmuller, U. Lundkvist, Acta Endcrinologia 64, 111–125 (1970);

(3) Isotopic Exchange Method, R. E. Counsell, V. V. Ranade, P. Pocha, R. E. Willette, W. Diguilio, J. Pharmaceut, Sciences 57, 1657 (1968); and (4) Electrolytic Iodination, F. Pennisi, U. Rosa, J. Nuclear Biol. and Medicine 13, 64 (1964).

The water-soluble substrates of the present invention, are iodinated in aqueous media or, if desired, may be iodinated in inert solvents or aqueous solvents comprising water and water miscible solvents such as methanol, ethanol, dioxane, tetrahydrofurane, dimethyl formamide, dimethyl sulfoxide, etc.

After iodination, unreacted labeled iodide is removed by methods in the art, e.g., via absorption on an ion exchange resin. The co-absorbed iodinated cardenolides may then be eluted selectively with an appropriate organic solvent. The extent of diiodination, where possible, is controllable by vary the substrate to iodine rato over the range of 1:1 to 100:1. As an example, for X=tyrosine, a ratio of 2.5:1 yields 15–20% diiodinated antigen compared to 5–7% at a ratio of 25:1. The singly and doubly labeled derivatives of low molecular weight can be readily resolved via preparative TLC or via silica gel chromatography to yield both components in >95% purity.

The following examples further illustrate the invention, but it is to be understood that the scope of the invention is not to be limited thereby. Unless otherwise specified, all parts are by weight and all temperatures are ° C.

EXAMPLE I (A) A solution of 630 mg. crude succinyl digitoxigenin-L-tyrosine methyl ester, 12 cc. methanol, and 8 cc. water containing 1.20 g. potassium carbonate is kept at 25° for eighteen hours. The mixture is acidified with dilute hydrochloric acid, concentrated to remove methanol, and extracted with ethyl acetate. The solvent layer is extracted with 2% aqueous sodium bicarbonate. The aqueous extract is acidified to pH 2–3 with dilute hydrochloric acid and re-extracted with ethyl acetate. The ethyl acetate extract is washed with water, dried and evaporated to a gum weighing 390 mg. Final purification is effected via gel filtration followed by thin layer chromatography and affords 29 mg. 3 - succinyldigitoxigenin-L-tyrosine, melting point 135–145°, $[\alpha]_D^{23}$ +32° (c.=0.275, methanol), log ε 3.22 at 278 mμ methanol) and 3.38 at 296 mμ (0.1 N).

(B) The procedure of Example I-A is repeated using 3-maleyl digitoxigenin-L-tyrosine methyl ester and 3-o-phthaloyl digitoxigenin-L-tyrosine methyl ester as the starting material to produce 3-maleyl digitoxigenin-L-tyrosine and 3-phthaloyl digitoxigenin-L-tyrosine, respectively. The starting materials are prepared by the method disclosed in the hereinabove referred article of Oliver et al. by using maleic anhydride and phthalic anhydride, respectively, instead of succinic anhydride.

(C) The procedures of Examples I-A and I-B are repeated using the methyl and ethyl esters of histidine, and 4-hydroxyphenylglycine and the ethyl ester of L-tyrosine as the amino acid ester moiety to produce corresponding amino acid compounds; i.e., 3-succinyl digitoxigenin-histidine; 3 - succinyl digitoxigenin 4-hydroxyphenylglycine; and 3-succinyl digitoxigenin-L-tyrosine, in addition to the corresponding maleyl and o-phthaloyl derivatives.

EXAMPLE II (A) A mixture of 66 mg. digitoxigenin-3-hemisuccinate, 4 cc. dicholromethane, 0.04 cc. triethylamine, and 0.052 cc. pivaloyl chloride is stirred at 20° for fifteen minutes and chilled to —10° prior to addition of a chilled suspension of 27 mg. L-tyrosine, 0.038 cc. tri-n-butylamine and 5 cc. pyridine followed by stirring for sixteen hours at 25°. The mixture is diluted with water, acidified with 6 N hydrochloric acid and extracted with ethyl acetate. The extract is washed with water, dried and evaporated to leave a gummy residue which is purified by thin layer chromatography. The product is identical to the product of Example I-A.

(B) The procedure of Example II-A is repeated with digitoxigenin - 3-maleate and digitoxigenin-3-o-phthalate, respectively to produce corresponding compounds.

(C) The procedures of Examples II-A and II-B are repeated with histidine and 4-hydroxyphenylglycine as the amino acid to produce corresponding derivatives.

EXAMPLE III (A) Iodination of 10 μg. 3-succinyl digitoxigenin-L-tyrosine produced by the procedure of Example I-A with 9 mc. $^{125}$I is effected at pH 7.4 by the method of Hunter and Greenwood at a substrate to iodine ratio of 2.5 to 1. Unreacted iodide is removed by passage through a quarternary amine anion exchange resin in the chloride form. The co-absorbed product is eluted and contains two iodination products, 3-succinyl digitoxigenin-(3'-iodo-L-tyrosine-$^{125}$I) and 3-succinyl digitoxigenin-(3',5'-diiodo-L-tyrosine-$^{125}$I$_2$). Separation of both components in radiochemical purity of greater than 95% is achieved by thin layer chromatography.

(B) The procedure of Example II-A is repeated with the other compounds which are produced in Example I to produce corresponding radioiodinated derivatives.

The fumaryl derivatives of the present invention are produced by isomerizing the maleyl derivatives by the isomerization procedures known in the art for isomerizing maleic acid to fumaric acid.

The radioiodinated derivatives of the present invention may be used as the labeled antigen in the radioimmunological assay of digitoxin. A radioimmunological assay procedure which may be employed is one which is a slight modification of the radioimmunological assay disclosed by Smith et al. New England Journal of Medicine, vol. 281, pages 1212-16 (March 27, 1969) for tritium labeled digoxin as follows:

To 1 ml. of serum in disposable plastic test tubes, 12 by 75 mm. (Falcon Plastics, Los Angeles, Calif.), is added, with thorough mixing, 3 ng. of a radioiodinated derivative of the present invention. Antidigitoxin antibody is then added in an amount sufficient to produce 37 to 50 percent binding of the radioiodinated derivative in the absence of unlabeled drug, and the mixture incubated at 25° C. for 1 hour. Competition between the radioiodinated compound and unlabeled digitoxin for antibody binding sites determines the amount of the radioiodinated compound-antibody complex present at equilibrium. Separation of bound from free radioiodinated compound is achieved by the dextran-coated charcoal technique of Herbert et al., J. Clin. Endocr., vol 25, 1375-1384 (1965) resulting in selective bonding of free labeled and unlabeled compound to the coated charcoal, which is then separated by centrifugation. The supernatant phase is decanted and counted in a gamma counter.

The ability to prepare the free amino acid compounds of the present invention from the methyl ester compound of the prior art was unexpected, in that the methyl ester was considered to be stable to hydrolyses, except for the use of a strong base, such as sodium hydroxide, which would be unsuitable, in that the use of such a strong base would destroy the overall compound.

The compounds of the present invention, as a result of their water solubility, are an improvement over the corresponding methyl esters of the prior art. Thus, for example, 3-succinyl digitoxigenin-L-tyrosine has a water solubility in the order of 10 milligrams per cubic centimeter of water, whereas 3-succinyl digitoxigenin-L-tyrosine methyl ester has a water solubility in the order of 10 to 20 micrograms per cubic centimeter of water. This 1000 fold increase in solubility is completely unexpected in that digitoxigenin is known to be water insoluble and, therefore, a change in a single functional group was not expected to provide such an increase in solubility.

The compounds of the present invention, as a result of the enhanced solubility and hydrophilicity are water soluble at physiological pH values and, accordingly, can be iodinated in aqueous media which facilitates both the iodination and recovery of the iodinated product; possess a side chain more nearly comparable in polarity to the tri-digitoxose moiety of natural cardenolides; exhibit superior binding to antibodies; and show a lesser tendency toward adsorption on lysophilic surfaces; e.g., plastic tubes. As a result, the use of these compounds obviates the need for organic solvents and protective albumins (the use of such albumins can adversely affect the assay); minimizes non-specific adsorption losses; and ensures facile reversibility of binding to antibody.

Numerous modifications and variations of the present invention are possible in light of the above teachings and therefore, within the scope of the appended claims, the invention may be practiced other than as specifically described.

What is claimed is:

1. A composition of matter comprising a compound having the following structural formula:

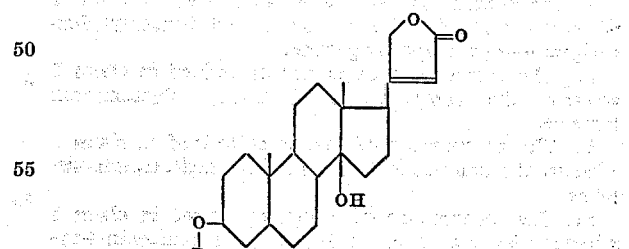

wherein B is selected from the group consisting of succinyl, maleyl, fumaryl and o-phthaloyl; and X is an amino acid radical selected from the group consisting of unlabeled and radiolabeled amino acid radicals having the following structural formulae:

(c)

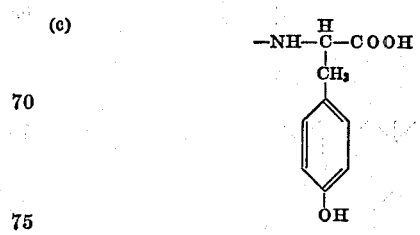

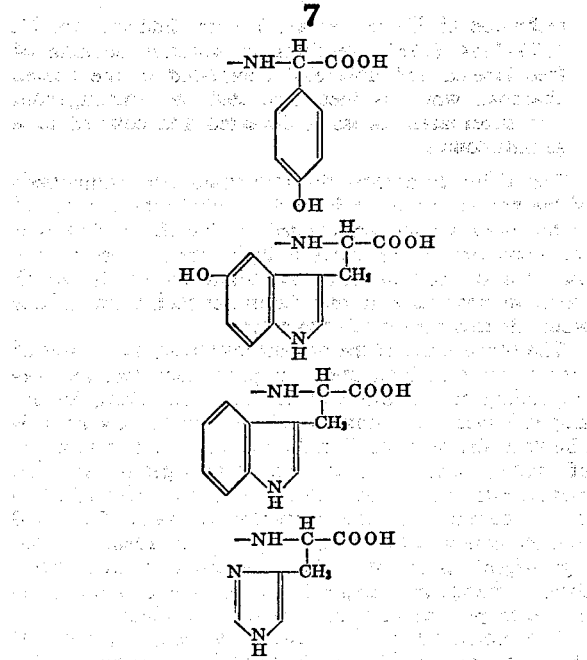

2. The composition of matter as defined in claim 1 wherein X is an unlabeled amino acid radical as defined in claim 1.

3. The composition of matter as defined in claim 1 wherein X is a radioiodinated amino acid radical as defined in claim 1.

4. The composition of matter as defined in claim 1 wherein B is succinyl.

5. The composition of matter as defined in claim 4 wherein X is a radioiodinated amino acid radical as defined in claim 1.

6. The composition of matter as defined in claim 4 wherein 5 is an unlabeled amino acid radical as defined in claim 1.

7. The composition of matter as defined in claim 1 wherein the compound is radioiodinated 3-succinyl digitoxigenin-tyrosine.

8. The composition of matter as defined in claim 1 wherein the compound is radioiodinated 3-succinyl digitoxigenin-histidine.

9. The composition of matter as defined in claim 1 wherein the compound is radioiodinated 3-succinyl digitoxigenin-4-hydroxyphenylglycine.

10. The composition of matter as defined in claim 1 wherein the compound is 3-succinyl digitoxigenin tyrosine.

11. The composition of matter as defined in claim 1 wherein the compound is 3 - succinyl digitoxigenin-histidine.

12. The composition of mater as defined in claim 1 wherein the compound is 3-succinyl-digitoxigenin-4-hydroxyphenylglycine.

13. In a process for the radioimmunological assay of digitoxin, the improvement comprising: employing as the radiolabeled compound in said radioimmunological assay of digitoxin, a compound having the following structural formula:

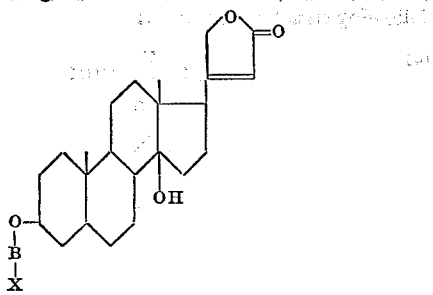

wherein B is selected from the group consisting of succinyl, maleyl, fumaryl and o-phthaloyl; and X is a radioiodinated amino acid radical selected from the group consisting of amino acid radicals having the following structural formulae:

(c)
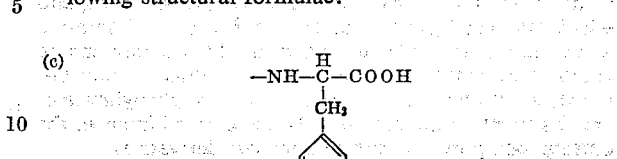
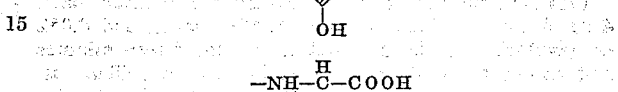
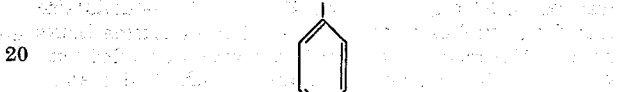
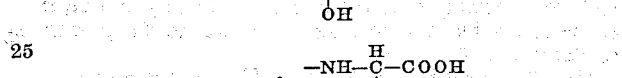
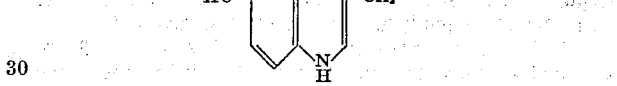
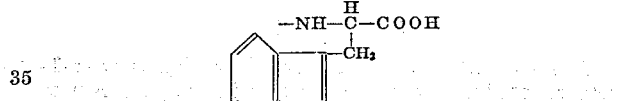
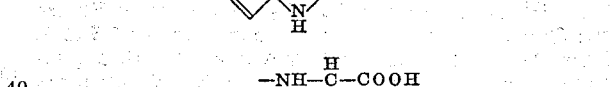
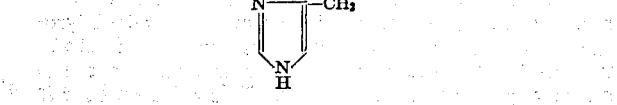

14. The process as defined in claim 13 wherein B is succinyl.

15. The process as defined in claim 13 wherein the compound is radioiodinated 3-succinyl digitoxinigenin-histidine.

16. The process as defined in claim 13 wherein the compound is radioiodinated 3 - succinyl digitoxigenin-4-hydroxyphenylglycine.

17. The process as defined in claim 13 wherein the compound is 3-succinyl digitoxigenin tyrosine.

18. A process for producing a compound having the following structural formula:

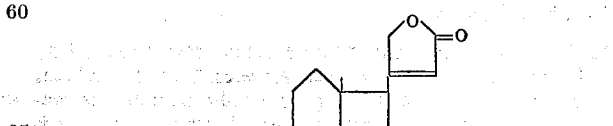
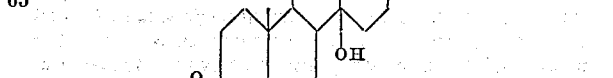
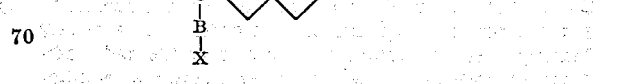

wherein B is selected from a group consisting of succinyl, maleyl and o-phthaloyl; and X is an amino acid radical selected from the group consisting of amino acid radicals having the following structural formulae:

(I)

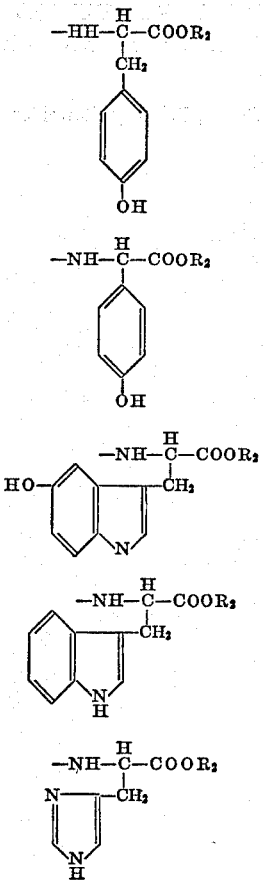

wherein $R_2$ is hydrogen comprising:

forming a mixed anhydride from a derivative of digitoxigenin selected from the group consisting of digitoxigenin-3-hemisuccinate, digitoxigenin-3-hemimaleate and digitoxigenin-3-hemiphthalate and a member selected from the group consisting of pivaloyl chloride, ethyl chloroformate and isobutyl chloroformate and coupling the mixed anhydride to an amino acid selected from the group consisting of histidine, L-tyrosine, 4-hydroxyphenylglycine, tryptophan and 5-hydroxytryptophan, to produce said compound.

19. The process of claim 18 wherein said mixed anhydride is formed under anhydrous conditions in an inert solvent at a temperature from about −10° C. to about 25° C. in the presence of an organic base.

20. The process of claim 19 wherein a solution of the amino acid is coupled to the mixed anhydride at a temperature from about −10° C. to about 25° C. in the presence of an organic base.

21. The process of claim 20 wherein the digitoxigenin derivative is digitoxingenin-3-hemisuccinate.

22. The process of claim 21 wherein the amino acid is 70 L-tyrosine.

23. The process of claim 21 wherein the amino acid is 4-hydroxyphenylglycine.

24. The process of claim 21 wherein the amino acid is histidine.

25. A process for producing a compound having the following structural formula:

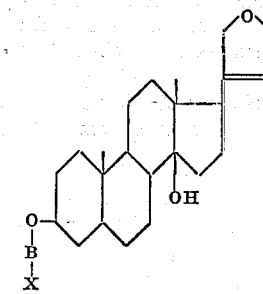

wherein B is selected from a group consisting of succinyl, maleyl, fumaryl and o-phthaloyl; and X is a radioiodinated amino acid radical selected from the group consisting of amino acid radicals having the following structural formulae:

1)

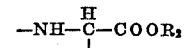

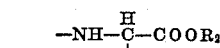

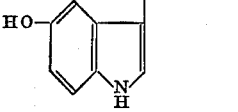

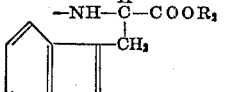

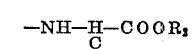

wherein $R_2$ is hydrogen comprising:

hydrolyzing a compound having structural (1) wherein $R_2$ is lower alkyl with an excess of a base selected from the group consisting of triethylamine, sodium carbonate, potassium carbonate, sodium hydrogen carbonate, potassium hydrogen carbonate and ammonia, said hydrolysis being effected at a temperature from about 5° C. to about 50° C.

26. The process of claim 25 wherein said hydrolysis is effected in a water miscible inert solvent.

27. The process of claim 25 wherein said hydrolysis is effected in an aqueous solution of a $C_1$ to $C_5$ alkanol.

28. The process of claim 27 wherein the hydrolysis is effected at a temperature from about 20° C. to about 25° C.

29. The process of claim 28 wherein the compound hydrolyzed is 3-succinyl digitoxigenin-L-tyrosine methyl ester.

References Cited
UNITED STATES PATENTS 3,398,138   8/1968   Lefebore et al. ----- 260—210.5
3,431,258   3/1969   Lefebore et al. ---- 260—239.57

OTHER REFERENCES

Oliver et al., Jour. Clinical Investigation, vol. 47, pp. 1035–37 (1968).

HENRY A. FRENCH, Primary Examiner

UNITED STATES PATENT OFFICE
CERTIFICATE OF CORRECTION

Patent No. 3,810,886                         Dated May 14, 1974

Inventor(s) HERMAN RUTNER et al

It is certified that error appears in the above-identified patent and that said Letters Patent are hereby corrected as shown below:

Column 10, Claim 25, line 22, "a radioiodinated" should be --an--.

Signed and sealed this 21st day of January 1975.

(SEAL)
Attest:

McCOY M. GIBSON JR.                   C. MARSHALL DANN
Attesting Officer                     Commissioner of Patents